United States Patent
Bove, Jr. et al.

(10) Patent No.: US 11,226,591 B2
(45) Date of Patent: Jan. 18, 2022

(54) TRANSPARENT FLAT-PANEL HOLOGRAPHIC DISPLAY

(71) Applicant: Massachusetts Institute of Technology, Cambridge, MA (US)

(72) Inventors: V. Michael Bove, Jr., Wrentham, MA (US); Sundeep Jolly, Boston, MA (US); Daniel E. Smalley, Provo, UT (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 16/660,777

(22) Filed: Oct. 22, 2019

(65) Prior Publication Data

US 2021/0003968 A1   Jan. 7, 2021

Related U.S. Application Data (60) Division of application No. 14/985,453, filed on Dec. 31, 2015, now Pat. No. 10,452,026, which is a continuation-in-part of application No. 13/437,850, filed on Apr. 2, 2012, now Pat. No. 9,983,547, which is a continuation of application No. 11/837,517, filed on Aug. 11, 2007, now Pat. No. 8,149,265, said application No. 14/985,453 is a continuation of application No. 14/213,333, filed on Mar. 14, 2014, now Pat. No. 10,108,146, and a continuation-in-part (Continued)

(51) Int. Cl.
*G03H 1/22* (2006.01)
*G03H 1/02* (2006.01)
*G02F 1/125* (2006.01)
*G02B 6/10* (2006.01)

(52) U.S. Cl.
CPC ........... *G03H 1/2294* (2013.01); *G02B 6/10* (2013.01); *G02F 1/125* (2013.01); *G03H 1/02* (2013.01); *G03H 2001/0224* (2013.01); *G03H 2001/2292* (2013.01); *G03H 2223/17* (2013.01); *G03H 2225/21* (2013.01)

(58) Field of Classification Search
None
See application file for complete search history.

(56) References Cited

U.S. PATENT DOCUMENTS 9,069,228 B2 * 6/2015 Han .................... G03H 1/2294

* cited by examiner

*Primary Examiner* — Chad H Smith
(74) *Attorney, Agent, or Firm* — Norma E. Henderson (57) ABSTRACT

In a method for forming a holographic image, light is provided to a flat-panel holographic video display that includes waveguide elements that each have a light-guiding substrate and an array of transducers configured to produce a diffraction grating comprising surface acoustic waves. The grating causes the waveguide to outcouple light, focusing it to, or producing wavefront curvatures consistent with it having emanated from, one or more points, in order to form a holographic image. The transducer array may include a large number of densely packed, vertically-adjacent transducers for each hogel for full parallax or may include a small number of vertically-adjacent transducers and a cylindrical optical element for each hogel. The display may be edge-illuminated by a collinear multicolor source. The substrate exit face may have nanopatterned areas alternated with flat areas in order to create regions of optimal internal reflection next to regions of low reflection.

20 Claims, 3 Drawing Sheets

Related U.S. Application Data of application No. 14/217,215, filed on Mar. 17, 2014, now abandoned.

(60) Provisional application No. 62/098,772, filed on Dec. 31, 2014, provisional application No. 61/784,887, filed on Mar. 14, 2013, provisional application No. 61/792,485, filed on Mar. 15, 2013.

TRANSPARENT FLAT-PANEL HOLOGRAPHIC DISPLAY

RELATED APPLICATIONS

This application is a divisional of U.S. patent application Ser. No. 14/985,453, filed Dec. 31, 2015, now U.S. Pat. No. 10,452,026, issued Oct. 22, 2019, which claims the benefit of U.S. Provisional application Ser. No. 62/098,772, filed Dec. 31, 2014, the entire disclosure of which is herein incorporated by reference.

U.S. patent application Ser. No. 14/985,453 is a continuation-in-part of U.S. patent application Ser. No. 13/437,850, filed Apr. 2, 2012, now U.S. Pat. No. 9,983,547, issued May 29, 2018, which is a continuation of U.S. patent application Ser. No. 11/837,517, filed Aug. 11, 2007, now U.S. Pat. No. 8,149,265, issued Apr. 3, 2012, the entire disclosures of which are herein incorporated by reference.

U.S. patent application Ser. No. 14/985,453 is also a continuation-in-part of U.S. patent application Ser. No. 14/213,333, filed Mar. 14, 2014, now U.S. Pat. No. 10,108,146, issued Oct. 23, 2018, which claims the benefit of U.S. Provisional Application Ser. No. 61/784,887, filed Mar. 14, 2013, the entire disclosures of which are herein incorporated by reference.

U.S. patent application Ser. No. 14/985,453 is also a continuation-in-part of U.S. patent application Ser. No. 14/217,215, filed Mar. 17, 2014, which claims the benefit of U.S. Provisional Application Ser. No. 61/792,485, filed Mar. 15, 2013, the entire disclosures of which are herein incorporated by reference.

FIELD OF THE TECHNOLOGY

The present invention relates to holographic video generation and, in particular, to a method for forming a holographic image by means of a transparent flat-panel holographic video display based on guided-wave electro-optics.

BACKGROUND

The limitations and affordances of holographic video displays are chiefly dictated by the spatial light modulators upon which they are built. The temporal bandwidth of the spatial light modulator determines the display size, view angle, and frame rate. The pixel pitch determines the angle of the display or the power of the lenses needed to achieve a wide view angle. The space-bandwidth product, which is related to the numerical aperture of the holographic grating, determines the maximum depth range and number of resolvable views the display will possess. Finally, optical non-idealities of the modulator give rise to noise and artifacts in the display output.

Current state-of-the-art technologies for spatial light modulation (e.g., liquid crystal (LC), micro-electro-mechanical systems (MEMS) [Kreis, T., Aswendt, P., and Hofling, R., "Hologram reconstruction using a digital micromirror device," Optical Engineering, vol. 40, pp. 926-933 (2001); Pearson, E., "MEMS spatial light modulator for holographic displays", S. M. Thesis, Massachusetts Institute of Technology (2001)], and bulk-wave acousto-optic modulators [Hilaire, P., Benton, S., and Lucente, M., "Synthetic aperture holography: a novel approach to three-dimensional displays," Journal of the Optical Society of America A, vol. 9, pp. 1969-1977 (1992)]) have proven challenging to employ in holographic video displays. The currently-employed modulators are challenging to use for several reasons, including low bandwidth (relative to holograms), high cost, low diffraction angle, poor scalability, quantization error, and the presence of zero and other order noise, unwanted diffractive orders, and zero-order light, as well as spatial or temporal multiplexing of color. These issues must therefore be addressed before using such modulators in a holographic display system.

Much of the cost and complexity of modern holographic displays is due to efforts to compensate for these deficiencies by, for example, adding eye tracking to deal with low diffraction angle [Haussler, R., Schwerdtner, A., and Leister, N., "Large holographic displays as an alternative to stereoscopic displays," Proceedings of SPIE Stereoscopic Displays and Applications XIX, p. 68030M (2008)], duplicating and phase shifting the optical path to eliminate the zero order [Chen, G. -L., Lin, C. -Y., Kuo, M. -K., and Chang, C. -C., "Numerical suppression of zero-order image in digital holography." Optics Express, vol. 15, pp. 8851-8856 (2007)], or creating large arrays of spatial light modulators to increase the display size [Sato, K., A. Sugita, M. Morimoto, and K. Fujii, "Reconstruction of Color Images at High Quality by a Holographic Display", Proc. SPIE Practical Holography XX, p. 6136 (2006)]. The cost and complexity of holographic video displays can be greatly reduced if a spatial light modulator could be made to have better affordances than the LC and MEMS devices currently employed.

Full-color, video-rate holograms stereograms using arrays of waveguides with acoustic grating patterns that diffract in one axis only (horizontal parallax only or HPO) have previously been produced [D. Smalley, Q. Smithwick, V. M. Bove, Jr., J. Barabas, S. Jolly, "Anisotropic leaky-mode modulator for holographic video displays." Nature 498.7454, pp. 313-317 (2013); D. Smalley, Q. Smithwick, J. Barabas, V. M. Bove, Jr., S. Jolly, and C DellaSilva, "Holovideo for everyone: a low-cost holovideo monitor," Proc. 9th International Symposium on Display Holography (ISDH 2012) (2012)]. The advantages of polarization rotation, enlarged angular diffraction, and wavelength division for red, green, and blue light have further been demonstrated.

SUMMARY

In one aspect of the invention, a flat-panel holographic video display includes a control layer comprising electrical inputs and configured for controlling drive electronics and light sources and at least one waveguide element electrically and optically connected to the control layer. Each waveguide element includes a light-guiding substrate physically coupled to the control layer and having optical inputs and an array of surface acoustic wave transducers arranged along an outer surface of the light-guiding substrate, the array being electrically connected to the control layer and configured to produce a diffraction grating comprising surface acoustic waves, wherein the surface acoustic wave diffraction grating causes the waveguide element to outcouple light bouncing within the substrate and focuses the outcoupled light to one or more points, or produces wavefront curvatures in the light consistent with its having emanated from one or more point sources, in order to form a holographic image. In a preferred embodiment, the transducers produce surface acoustic waves having at least one frequency component that is a standing wave. In a preferred embodiment, the transducers are arranged in a regularly spaced array and light bouncing within the substrate which is not diffracted and outcoupled at a first surface acoustic wave diffraction grating moves through the substrate to a next surface acoustic wave diffraction grating.

In some embodiments, the transducer array comprises a large number of densely packed, vertically (with respect to the orientation of the holographic screen) adjacent transducers for each hogel. In other embodiments, the transducer array comprises a small number of vertically-adjacent transducers for each hogel and includes a cylindrical optical element placed in front of each hogel. Some embodiments include a spatial filter that allows the display light to pass but blocks internal noise from scatter at the backplane. In some embodiments, the display is edge-illuminated by a collinear multicolor source. In some embodiments, the exit face of the substrate has nanopatterned areas alternated with pristine flat surface areas in order to create regions of optimal internal reflection next to regions of low Fresnel reflection, thereby providing for lossless propagation of confined light and efficient exit of unconfined light. Some embodiments may include a second array of surface acoustic wave transducers oriented at 90 degrees to the transducer array, configured so that the display's optical characteristics are uniform regardless of viewing direction. Some embodiments may include at least one internal or external filter to render the display opaque or semi-opaque.

In another aspect of the invention, a waveguide element for a flat-panel holographic video display includes a light-guiding substrate physically coupled to the control layer and having optical inputs and an array of surface acoustic wave transducers arranged along an outer surface of the light-guiding substrate, the array being electrically connected to the control layer and configured to produce a diffraction grating comprising surface acoustic waves, wherein the surface acoustic wave diffraction grating causes the waveguide element to outcouple light bouncing within the substrate and focuses the outcoupled light to one or more points, or produces wavefront curvatures in the light consistent with its having emanated from one or more point sources, in order to form a holographic image. In a preferred embodiment, the transducers produce standing surface acoustic waves. In a preferred embodiment, the transducers are arranged in a regularly spaced array and light bouncing within the substrate which is not diffracted and outcoupled at a first surface acoustic wave diffraction grating moves through the substrate to a next surface acoustic wave diffraction grating.

In some embodiments, the transducer array comprises a large number of densely packed, vertically-adjacent transducers for each hogel. In other embodiments, the transducer array comprises a small number of vertically-adjacent transducers for each hogel and includes a cylindrical optical element placed in front of each hogel. Some embodiments include a spatial filter that allows the display light to pass but blocks internal noise from scatter at the backplane. In some embodiments, the waveguide element is edge-illuminated by a collinear multicolor source. In some embodiments, the exit face of the substrate has nanopatterned areas alternated with pristine flat surface areas in order to create regions of optimal total internal reflection next to regions of low Fresnel reflection, providing for lossless propagation of confined light and efficient exit of unconfined light. Some embodiments may include a second array of surface acoustic wave transducers oriented at 90 degrees to the transducer array, configured so that the optical characteristics of the holographic output are uniform regardless of viewing direction.

In a further aspect of the invention, a method for creating a holographic image includes the steps of providing one or more wavelengths of light to a holographic video display, the display comprising at least one waveguide element, each waveguide element comprising a light-guiding substrate physically coupled to the control layer and having optical inputs and an array of surface acoustic wave transducers arranged along an outer surface of the light-guiding substrate, the array being electrically connected to the control layer and configured to produce a diffraction grating comprising surface acoustic waves, wherein the surface acoustic wave diffraction grating causes the waveguide element to outcouple light bouncing within the substrate and focuses the outcoupled light to one or more points, or produces wavefront curvatures in the light consistent with its having emanated from one or more point sources, in order to form a holographic image; providing holographic information to the video display; coupling the light received at the holographic video display into the waveguide elements for diffraction according to the holographic information; and scanning the diffracted light to form the holographic image. A holographic video display that performs the method and a holographic image produced using the method are further within the scope of the invention.

BRIEF DESCRIPTION OF THE DRAWINGS

Other aspects, advantages and novel features of the invention will become more apparent from the following detailed description of the invention when considered in conjunction with the accompanying drawings, wherein.

DETAILED DESCRIPTION

A flat panel holographic video display according to the invention is based on space-multiplexed, light-recycling, guided-wave acousto-optic, spatial light modulation that is capable of transparent operation. Optionally, the display can be made opaque or semi opaque with internal or external filters, which permits daylight operation with low noise and low glare. Full-parallax instantiations include fully holographic or lenticular approaches. Fabrication complexity may in some of these embodiments be reduced to a patterned single layer on a monolithic substrate for extremely low cost and simplicity. A flat-panel holographic display according to the invention may feasibly be scaled from microns to meters across.

The present invention builds on and employs the guided-wave technology previously described in U.S. Pat. No. 8,149,265, U.S. patent application Ser. No. 13/437,850, U.S. patent application Ser. No. 14/213,333, and U.S. patent application Ser. No. 14/217,215, all of which are incorporated by reference herein in their entirety. This previous work has demonstrated that guided-wave devices based on proton-exchanged lithium niobate can not only be used for inexpensive holographic displays, but also exhibit polarization rotation, allowing noise and undiffracted light to be eliminated with a polarizer, and wavelength division multiplexing, allowing simultaneous red, green, and blue illumination without color filters, or spatial/temporal multiplexing.

A flat-panel holographic video display according to a preferred embodiment of the invention includes a control layer and at least one waveguide element. Each waveguide element includes a light-guiding substrate (lightguide or waveguide) and an array of surface acoustic wave transducers arranged along an outer surface of the substrate. The light-guiding substrate is physically coupled to the control layer and has optical inputs. The control layer is configured for controlling drive electronics and light sources and has electrical inputs that are electrically connected to the transducers of the waveguide element.

The array of surface acoustic wave transducers is configured to produce a diffraction grating comprising surface acoustic waves. The diffraction grating causes the waveguide element to outcouple light bouncing within the substrate and focuses the outcoupled light to one or more points, or produces wavefront curvatures in the light consistent with its having emanated from one or more point sources, in order to form a holographic image. The transducers may be arranged in a regularly spaced array so that light which is not diffracted moves through the substrate to a next diffraction grating. The transducer array may include a large number of densely packed, vertically (with respect to holographic screen orientation) adjacent transducers for each hogel, or may include a small number of vertically-adjacent transducers for each hogel and a cylindrical optical element placed in front of each hogel. A spatial filter may be included to allow the display light to pass but block internal noise from scatter.

The display may be edge-illuminated by a collinear multicolor source. The exit face of the substrate may have nanopatterned areas alternated with pristine flat surface areas in order to create regions of optimal internal reflection next to regions of low Fresnel reflection, thereby providing for lossless propagation of confined light and efficient exit of unconfined light. In an embodiment having this feature, light at the correct angle would experience total internal reflection in both regions. However, light outside the critical angle would experience much less Fresnel reflection in the nanopatterned regions, which results in high transmission. There is also an instantiation where light in the light-guide bounces next to a hogel, rather than in the center of a hogel, where it encounters a fixed input grating to a local, shallow waveguide. Once in the waveguide it interacts with surface acoustic waves. This is a more complicated but potentially more efficient design. Some embodiments may also include a second array of surface acoustic wave transducers oriented at 90 degrees to the transducer array.

A preferred embodiment of a display according to the invention uses resonant holography, edge-lit waveguide optics, and standing-wave acoustics to create an inexpensive, thin, transparent, full-color holovideo display with possibly up to a 180 degree viewzone, extremely high refresh rate (potentially into the MHz), high optical efficiency, and low glare. The resulting display device is suitable for mobile and fixed display applications, with the transparency allowing the display itself to "disappear", as the reconstructed holographic image can appear behind or in front of the physical device, as well as permitting augmented-reality applications. If the image appears in front of the physical display, direct gestural and haptic interactions become possible.

To achieve large displays, the output of waveguide modulators may be optically or physically multiplexed. When optically multiplexed, the output of the guided wave modulator is duplicated, scanned, and reimaged to build a large output. However, because of their low cost and monolithic fabrication, waveguide modulators may also be physically multiplexed. This means that each modulator becomes a single holographic imaging element (sometimes called a 'wafel' or 'hogel'). Arrays of such elements form large, flat, potentially transparent displays.

Flat displays according to one aspect of the invention may preferably have at least the following affordances that are described in more detail below: edge-lit waveguide optics, surface acoustic standing waves, and resonant holography.

Edge-lit waveguide optics. Because light in the waveguide encounters the acoustic waves at a shallow angle rather than at a right angle, the apparent size of the diffraction pattern encountered by the light is foreshortened significantly, meaning that larger diffraction angles than possible with other spatial light modulator technologies can be created—as much as 5 times the angular deflection for a given pixel pitch when compared to devices illuminated by light normal to the display's surface. Further, exiting the waveguide from a high to a low index material increases the total angular deflection of the holographic element and makes it possible to achieve maximum horizontal viewzone of 180 degrees.

Common light modulator technologies (such as, but not limited to, LCoS and MEMs) have a pixel structure that generates multiple undesired diffracted orders. In contrast, edge-lit optics permits a single diffracted order to be generated, increasing the efficiency of the use of the illumination and also eliminating the need to block undesired orders from the viewer. The structures needed for a guided-wave display device are much simpler to fabricate, requiring five or fewer mask steps, which is significantly fewer than typical light modulator technologies.

Surface acoustic standing waves. Standing waves are stationary and therefore do not need scanning optics to produce a stationary image. Standing waves produce higher amplitude waveforms and greater diffraction efficiency than traditional SAW devices, since diffraction goes as the square of the amplitude. In some embodiments, the overall surface acoustic wave continues to move but is modulated onto a lower-frequency standing wave. Traveling waves can be strobed, but they can also be illuminated continuously, so long as some image degradation and disruption of the wavefront curvature is acceptable, which deleterious effects are also seen to be reduced as the hogel/wafel becomes small.

Resonant holography. Resonant holography recycles undiffracted light, which is then reused to illuminate neighboring hogels. The total optical efficiency of a display according to this embodiment is the sum of each of the individual hogel efficiencies, and therefore total optical efficiencies above 50% are possible. Resonant holography greatly simplifies optical illumination of hogels. Resonant holography, in a display according to the invention, propagates the zero order (undiffracted light) away from the viewer so that it cannot interfere with the holographic image as it does in other pixelated hologram technologies (such as, but not limited to, LCoS and MEMs).

A preferred embodiment of a display according to the invention comprises an array of surface acoustic wave transducers on a light-guiding substrate. Light bouncing in the guide is outcoupled from the guide as it is diffracted by surface acoustic waves. Light which is not diffracted moves to the next surface acoustic wave pattern. In this way, waste light is recycled, and the aggregate diffraction efficiency of the display as a whole can be made very high. The outcoupling can be further optimized by nanopatterning the exit face of the substrate to create a region of very high transmission, even at non-normal angles. Nanopatterned areas are alternated with pristine flat surface to create regions of total internal reflection next to regions of high transmission. The exiting light will be passing from a high index to a low index, which means that a much smaller internal angle may result in display output angle ranges approaching 180 degrees.

The display, as described, is transparent. The illumination light is preferably collinear for all colors. If full parallax is desired instead of horizontal parallax only, many transducers can be placed in vertical adjacency, where "vertical" is defined as being with respect to the orientation of the holographic screen orientation (rather than with respect to the control layer). Full parallax can also be achieved with only a small number of vertically-adjacent transducers by the addition of cylindrical optics with power in the vertical dimension. The further addition of a spatial filter allows the display light to pass but blocks internal noise from scatter at the back plane. From the outside, light that would normally become display glare is absorbed by the spatial filter, greatly increasing contrast and allowing daylight operation. The display may also include a second array of transducers oriented at 90 degrees with orthogonal illumination, so that the display's optical characteristics are uniform regardless of viewing direction. Multiple displays may be layered together or overlaid onto other displays of all types.

Figure 1:
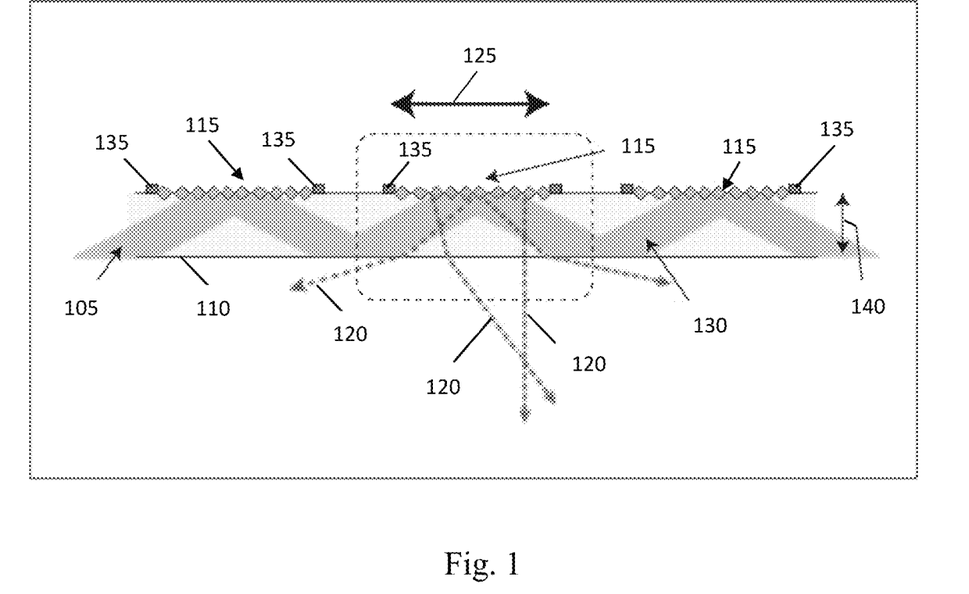
FIG. 1 depicts the operation of a generalized exemplary embodiment of a holographic video display according to the invention.

FIG. 1 depicts the operation of a generalized preferred embodiment of an exemplary display according to the invention, as viewed from the top of the screen. In FIG. 1, light 105 traveling through waveguide 110 interacts with surface acoustic wave diffraction patterns 115 at the back of the display and couples out 120 of the waveguide toward the viewer. According to the invention, diffracted holographic output 120 can be made to cover a full 180 degrees horizontally. FIG. 1 shows a portion of one scan line, equal to one hogel 125. Display illumination 105 is contained within waveguide 110 by total internal reflection. Undiffracted light 130 is recycled and used to illuminate downstream hogels. In the embodiment of FIG. 1, standing surface acoustic waves 115 are produced by RF surface acoustic wave transducers 135. While standing waves 115 are shown in FIG. 1, and tend to be superior to travelling waves, traveling waves may alternatively be used. Screen thickness 140 can be chosen, and can be as little as less than one-half the length of hogel 125.

Fabrication. The display is fabricated on a light-guiding substrate. For example, the substrate may be, but is not limited to being, a piezoelectric material such as lithium niobate. The substrate also need not be a piezoelectric material, so long as there is piezoelectric material (such as, but not limited to, a thin film of ZnO) underneath the transducers, and so long as the light guiding material can support surface acoustic waves (i.e. relatively low SAW attenuation). Transducers can be made by, for example but not limited to, direct electron-beam writing or photolithography. The transducers are preferably in a regularly spaced array so that light bouncing in the waveguide has a footprint between each pair of transducers. Alternatively, the waveguides can be created by femtosecond laser writing and the transducers can likewise be printed by using femtosecond laser pulses to transfer metal film selectively from a carrier substrate.

Control. As previously described, the control layer controls the display drive electronics and light sources and is electrically connected to the transducers of the waveguide element. Unlike previous devices, where a single electrical connection (i.e. one video signal from a GPU) drives an entire line of hogels, a flat-panel display according to the invention has electrical inputs for every hogel. These may be supplied by, as non-limiting examples, a large number of small graphics cores, a small number of high-end graphics cores, or by an FPGA or ASIC solution. Multiplexing and addressing schemes as used in other flat-panel display technologies may also be applied.

Illumination. There are generally two ways employed to get light into the waveguide/lightguide: 1) through the top layer by means of a coupling grating or prism or other structure, or 2) through the side, in which case there is no optical input on the top layer. In a preferred embodiment, a display according to the invention is edge-illuminated by a collimated multicolor source such as, but not limited to, collimated RGB laser source. Carefully collimated, narrow band LEDs may also be used. Each color is coupled into the lightguide at the same internal angle, and they are launched so that they propagate collinearly. By polishing one edge of the display substrate at an angle orthogonal to the desired propagation angle, the collinear input will stay collinear as it enters the display substrate from the air. The illumination strategy can be as simple as a footprint at every hogel, or may be much more complex. For example, in one embodiment, the display's power output is homogenized by having the light travel at a lower angle, skipping every other hogel and then reflecting and illuminating those hogels on the return path. Homogenization of output light may also be achieved by illuminating the display from both edges. Alternatively, the light may be coupled into the waveguide by means of a surface grating that may be fabricated through photolithography, electron-beam writing, or laser micromachining, as well as any of the other means known in the art of the invention.

While wavelength division multiplexing may not be fully compatible with displays made in the above-described way, full color operation can also be accomplished by time-multiplexing the color signal. The ultra-high refresh rate (MHz) of the display makes time-multiplexing a practical strategy. Space-multiplexing is also possible.

Figure 2:
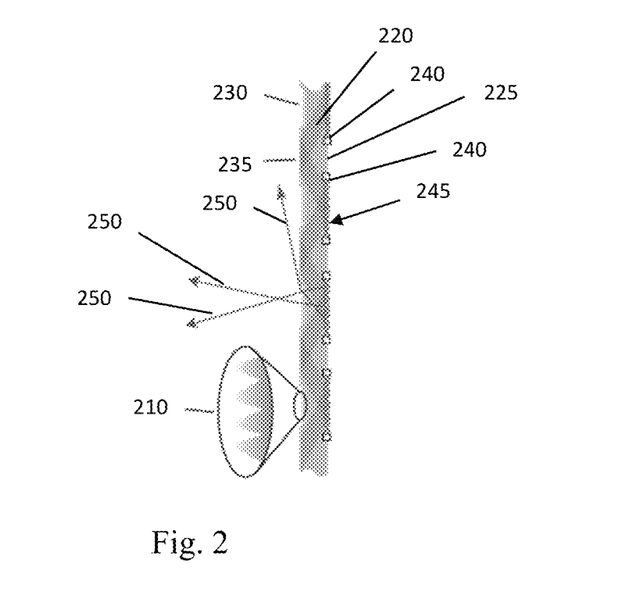
FIG. 2 depicts how varying the surface features may increase efficiency and contrast of a display according to an aspect of the invention.

To make the most efficient use of the illumination, and also to increase the contrast of the display, it is desirable to ensure that light couples out of the waveguide only in regions where it interacts with the diffraction patterns, while regions between hogels support total internal reflection in the waveguide. It is possible to use different surface structures in order to create regions of zero and total reflection, as shown in FIG. 2, which depicts how varying the surface features may increase the efficiency and contrast of the display. As a non-limiting example, a set of conical structures etched into the substrate and fabricated at a period of a few hundred nanometers or less with a long adiabatic taper would reduce Fresnel reflection, even at high angles near total internal reflection. Shown in the exemplary embodiment of FIG. 2 are adiabatic microstructure 210, for low reflection and efficient optical outcoupling at high angles, display illumination 220, waveguide 225, region of zero reflection 230, region of total reflection 235, standing surface wave transducers 240, standing surface waves 245, and diffracted holographic output 150.

Figure 3:
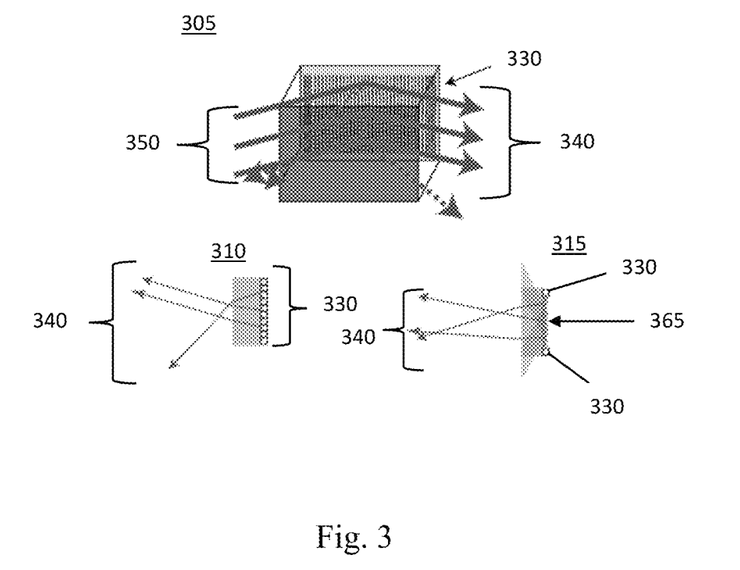
FIG. 3 depicts how full parallax can be achieved by adding vertical channels to each hogel, according to one aspect of the invention.

Holographic vertical parallax may be achieved with a large number of densely packed, vertically-stacked transducers, as shown in FIG. 3. FIG. 3 depicts how full parallax can be achieved by adding vertical (with respect to the orientation of the holographic screen) channels to each hogel, thereby providing fully holographic control in both axes. If there are enough vertical transducers, closely spaced, they form a coherent, two dimensional holographic fringe pattern of surface acoustic waves. Shown in the exemplary embodiment of FIG. 3 are three-dimensional 305, side 310, and top 315 views of such a system, having a large number of vertical transducers 330 in order to create an arbitrary diffraction pattern 340 from display illumination 350. Side view 310 illustrates arbitrary vertical control, with no lenslet needed, and top view 315 illustrates arbitrary horizontal control, showing vertically-stacked transducers 330 and standing waves 365.

Figure 4:
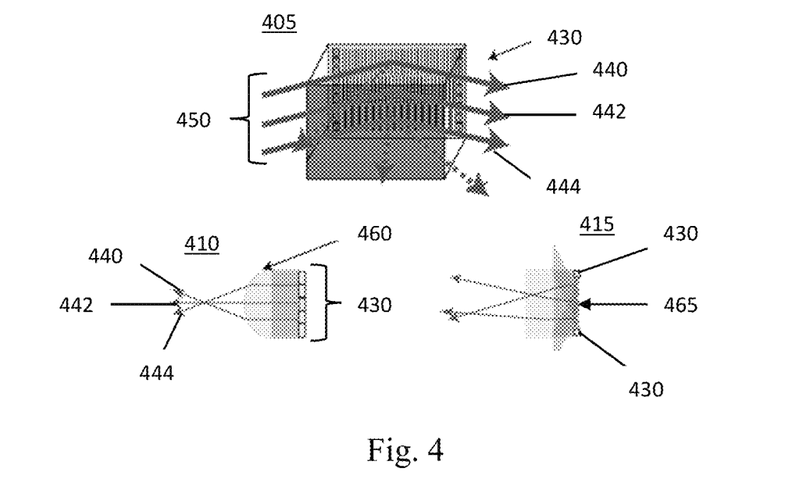
FIG. 4 depicts how discrete vertical parallax may be achieved with a lenslet in front of each hogel and a small number of vertically-adjacent transducers, according to another aspect of the invention.

Alternatively, low bandwidth vertical parallax may be achieved with a small number of vertically-stacked transducers and a cylindrical lenslet array, as shown in FIG. 4. The lenslet may also serve as a vertical diffuser. FIG. 4 depicts how discrete vertical parallax may be achieved with a lenslet in front of each hogel and a small number of vertically-adjacent transducers, providing discrete vertical views. Shown in the exemplary embodiment of FIG. 4 are three-dimensional 405, side 410, and top 415 views of such a system, having a small number of vertical transducers 430 in order to create discrete vertical views 440, 442, 444 from display illumination 450 with the use of cylindrical lenslet 460. Side view 410 illustrates discrete vertical views 440, 442, 444, and top view 415 illustrates arbitrary horizontal control, showing transducers 430 and standing waves 465.

Figure 5:
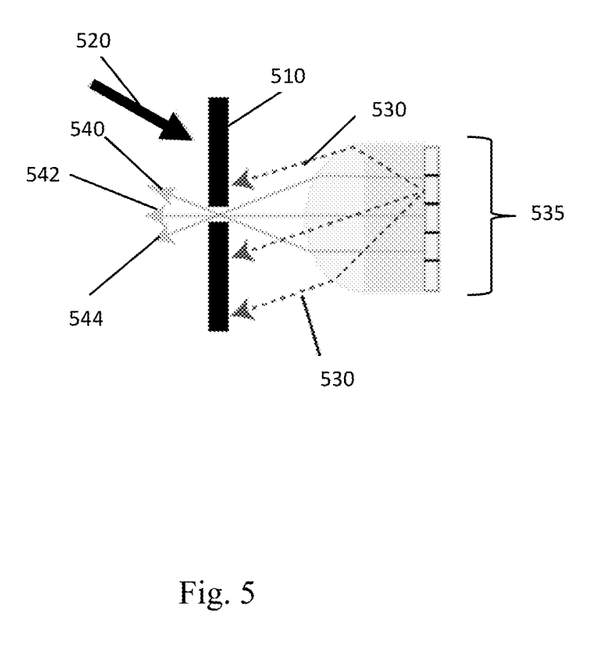
FIG. 5 depicts how high contrast, low glare, and high signal-to-noise ratio can be achieved by adding a vertical spatial filter comprising horizontally-oriented slits, according to a further aspect of the invention.

Noise filtering and glare reduction can be achieved by adding a spatial filter to the lenslet array, as shown in FIG. 5. The exemplary embodiment of FIG. 5 depicts how high contrast, low glare, and high signal-to-noise ratio can be achieved by adding vertical spatial filter/absorber 510 comprising horizontally-oriented slits. Using filter 510, room light 520 is absorbed, reducing glare. Scattered light 530 coming from lenslets 535 is also blocked by vertical spatial filter 510, increasing signal-to-noise ratio and reducing glare for discrete views 540, 542, 544.

An embodiment of a display according to the invention that has a limited active area and smaller diffraction angles would be suitable for a wearable or near-to-eye lightfield display. In such a case, it may be useful to incorporate separate or integrated physical or diffractive optical elements so that the reconstructed holographic lightfield appears at the appropriate distances from the eye for a particular application.

Advantages and improvements over existing methods. A display according to the invention, along with those disclosed in the applications incorporated by reference herein, is the first transparent holographic video display. It is therefore the most appropriate holographic display for augmented reality, whether in panel or near-to-eye format. Similarly, waveguide displays like those disclosed are the only flat holographic video displays currently capable of anything close to a 180 degree viewing angle.

Furthermore, the optical portion of the display, with its monolithic substrate and single mask fabrication, is simpler to build than any extant holovideo display. The edge illumination of color is extremely simple. The array of transducers makes a highly accessible back plane, which lends itself to a parallel drive scheme (such as, for example, a "sea" of directly bonded graphics processors) and makes possible seamless tiling of panels for arbitrarily large displays. The display benefits from being a waveguide device, in that it has a much higher angle scan for a given fringe size compared to pixelated displays, since from the perspective of the propagating light, the acoustic waves are foreshortened significantly, and thus create the effect of much smaller diffractive features. As a SAW-based display, it has no fixed pixel structure, and thus the resulting hologram has no noise or higher-order images of the sort that would arise from a pixelated display.

Commercial applications. Flat holographic displays have application where space is limited and where large amounts of complex information must be visualized, such as, but not limited to, in commercial mobile devices and in military aircraft and watercraft. Large holographic displays have application for collaborative endeavors (such as, but not limited to, oil exploration), telepresence, simulation and medical imaging, and as part of a large number of other applications. Because of the simplicity of the structure, a display according to the invention may be manufactured at a price point appropriate for consumer electronics applications. Because of the see-through nature of the display, it also may prove suitable for near-to-eye applications. While holographic displays enable the reconstruction of three-dimensional imagery, display technology according to the invention is also suited for any application where a 2D see-through display is needed.

The following features, implementations, modifications, and applications of the described technology are further contemplated by the inventors and are therefore considered to be within the scope of the invention:

A device capable of using surface acoustic waves to modulate light within a generalized waveguide, including large waveguides. This includes light guides of arbitrary depth from nanometers to millimeters thick and beyond, and includes both guides with discrete and continuous modes and propagation schemes, including as few as one light guided bounce. This extends to nonpiezoelectric substrates. This also includes both index- and gap-guided (guided in high or low index relative to boundaries) light with periodic- or non-periodic boundaries (including, but not limited to, photonic crystals).

A display comprising an array of SAW transducers, which may be oriented along one or more axes, or in other arrangements, including, but not limited to, arbitrary rotational angles relative to an axis.

A display that provides for directly viewing the holographic lightfield from the surface of the modulator (perhaps including optical elements that are part of the surface), as opposed to placing separate scanning or imaging optics between the device and the viewer.

A device with alternating regions of high and low reflection created using photonic crystals or adiabatic nanopatterning (1-, 2- or 3-dimensional patterns).

An illumination strategy permitting collinear, multicolor operation.

A system capable of recycling the zero order, or undiffracted, beam for "Resonant Holographic Video" operation.

A method for creating uniform output brightness across the display by counter-propagating illumination and multi-pass illumination.

Methods for driving the display output including, but not limited to, continuous illumination or pulsed illumination (with a duty cycle anywhere between 0-100%), full-parallax or horizontal-parallax outputs, use of traveling and/or standing waves, and reduction of drive complexity by applying rastering, such as, but not limited to, rastering in angle or rastering in Z, such as, but not limited to, using standing wave hogels as acoustic varifocal lenses or time varying prisms.

Pulsed single and bidirectional arbitrary holographic patterns.

A system that achieves vertical parallax with high density electrodes or with cylindrical lens and optional vertical spatial filter, which doubles as vertical diffuser.

Use of a vertical spatial filter for effective noise reduction from scatter.

Use of a vertical spatial filter to increase contrast by absorbing glare light for daylight operation.

Use of the invention for a 2D display, 3D display, and/or for see-through near-to-eye displays.

In addition to the above, while preferred embodiments of the invention are disclosed herein, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention.

What is claimed is:

1. A method for creating a holographic image, comprising:
    providing one or more wavelengths of light to a holographic video display, the display comprising at least one waveguide element, each waveguide element comprising:
        a light-guiding substrate physically coupled to a control layer and having optical inputs, wherein an exit face of the substrate has nanopatterned areas alternated with pristine flat surface areas in order to create regions of optimal internal reflection next to regions of low Fresnel reflection, thereby providing for minimized loss of propagation of confined light and efficient exit of unconfined light; and
        an array of surface acoustic wave transducers arranged along an outer surface of the light-guiding substrate, the array being electrically connected to the control layer and configured to produce a diffraction grating comprising surface acoustic waves, wherein the surface acoustic wave diffraction grating causes the waveguide element to outcouple light bouncing within the substrate and focuses the outcoupled light to one or more points, or produces wavefront curvatures in the light consistent with its having emanated from one or more point sources, in order to form a holographic image;
    providing holographic information to the video display;
    coupling the light received at the holographic video display into the waveguide elements for diffraction according to the holographic information; and
    scanning the diffracted light to form the holographic image.

2. The method for creating a holographic image of claim 1, wherein the transducers produce surface acoustic waves having at least one frequency component that is a standing wave.

3. The method for creating a holographic image of claim 1, wherein the transducers are arranged in a regularly spaced array and light bouncing within the substrate which is not diffracted and outcoupled at a first surface acoustic wave diffraction grating moves through the substrate to a next surface acoustic wave diffraction grating.

4. The method for creating a holographic image of claim 1, wherein the transducer array on each waveguide element comprises a large number of densely packed, vertically-adjacent transducers.

5. The method for creating a holographic image of claim 1, wherein the transducer array on each waveguide element comprises a small number of vertically-adjacent transducers and further comprising a cylindrical optical element placed in front of each waveguide element.

6. The method for creating a holographic image of claim 1, further comprising edge-illuminating the display.

7. A holographic video display that performs the method of claim 1.

8. A holographic video image produced using the method of claim 1.

9. A method for creating a holographic image, comprising:
    providing one or more wavelengths of light to a holographic video display, the video display comprising:
        a control layer, the control layer comprising electrical inputs and configured for controlling drive electronics and light sources; and
        a plurality of independently-controlled simultaneously-operable waveguide elements coupled to the control layer, each simultaneously-operable waveguide element comprising:
            a light-guiding substrate physically coupled to the control layer and having optical inputs; and
            an array of surface acoustic wave transducers arranged along an outer surface of the light-guiding substrate, the array being electrically connected to the control layer and configured to produce a diffraction grating comprising surface acoustic waves, wherein the surface acoustic wave diffraction grating causes the waveguide element to outcouple light bouncing within the substrate and focuses the outcoupled light to one or more points, or produces wavefront curvatures in the light consistent with its having emanated from one or more point sources, in order to form a holographic image,
    wherein each independently-controlled simultaneously-operable waveguide element is individually independently controlled and driven by dedicated associated electrical inputs from the control layer to the array of transducers, such that light within each waveguide element is independently and differentially diffracted with respect to light within each of the other independently-controlled simultaneously-operable waveguide elements, due to a different diffraction grating produced by the array of transducers because of different inputs received from the associated electrical inputs, and wherein at least some of the independently-controlled simultaneously-operable waveguide elements are operated at the same time as others of the independently-controlled simultaneously-operable waveguide elements;
    providing holographic information to the holographic video display;
    coupling the light received at the holographic video display into the waveguide elements for diffraction according to the holographic information; and scanning the diffracted light to form the holographic image.

10. The method for creating a holographic image of claim 9, wherein the transducers produce surface acoustic waves having at least one frequency component that is a standing wave.

11. The method for creating a holographic image of claim 9, wherein the transducers are arranged in a regularly spaced array and light bouncing within the substrate which is not diffracted and outcoupled at a first surface acoustic wave diffraction grating moves through the substrate to a next surface acoustic wave diffraction grating.

12. The method for creating a holographic image of claim 9, wherein the transducer array on each waveguide element comprises a large number of densely packed, vertically-adjacent transducers.

13. The method for creating a holographic image of claim 9, wherein the transducer array on each waveguide element comprises a small number of vertically-adjacent transducers and further comprising a cylindrical optical element placed in front of each waveguide element.

14. The method for creating a holographic image of claim 9, further comprising a spatial filter that allows the display light to pass but blocks internal noise from scatter at the backplane.

15. The method for creating a holographic image of claim 9, wherein the display is edge-illuminated by a collinear multicolor source.

16. The method for creating a holographic image of claim 9, further comprising a second array of surface acoustic wave transducers oriented at 90 degrees to the transducer array, configured so that the display's optical characteristics are uniform regardless of viewing direction.

17. The method for creating a holographic image of claim 9, further comprising at least one internal or external filter to render the display opaque or semi-opaque.

18. The method for creating a holographic image of claim 9, wherein an exit face of the substrate has nanopatterned areas alternated with pristine flat surface areas in order to create regions of optimal internal reflection next to regions of low Fresnel reflection, thereby providing for minimized loss of propagation of confined light and efficient exit of unconfined light.

19. A holographic video image produced using the video display of claim 1.

20. A method for creating a holographic image, comprising:
providing one or more wavelengths of light to a holographic video display, the video display comprising:
a control layer, the control layer comprising electrical inputs and configured for controlling drive electronics and light sources; and
at least one waveguide element coupled to the control layer, each waveguide element comprising:
a light-guiding substrate physically coupled to the control layer and having optical inputs, wherein an exit face of the substrate has nanopatterned areas alternated with pristine flat surface areas in order to create regions of optimal internal reflection next to regions of low Fresnel reflection, thereby providing for minimized loss of propagation of confined light and efficient exit of unconfined light; and
an array of surface acoustic wave transducers arranged along an outer surface of the light-guiding substrate, the array being electrically connected to the control layer and configured to produce a diffraction grating comprising surface acoustic waves, wherein the surface acoustic wave diffraction grating causes the waveguide element to outcouple light bouncing within the substrate and focuses the outcoupled light to one or more points, or produces wavefront curvatures in the light consistent with its having emanated from one or more point sources, in order to form a holographic image;
providing holographic information to the holographic video display;
coupling the light received at the holographic video display into the waveguide elements for diffraction according to the holographic information; and
scanning the diffracted light to form the holographic image.

* * * * *